UNITED STATES PATENT OFFICE 2,382,919

ESTERS OF ALEURITIC ACID

William Joseph Sartori, Brooklyn, N. Y.

No Drawing. Application April 8, 1942,
Serial No. 438,119

14 Claims. (Cl. 106—182)

This invention relates to alkyl esters of aleuritic and to their use as plasticizers for cellulose ethers and esters.

The preparation of alkyl aleuritates, has been described by various workers. (Ber. 55B, 3843–48 (1922); Wiss Veroffentlich Siemens-Konzern 10, No. 2, 108–18 (1931). To the best of my knowledge, however, the use of alkyl aleuritates has not been disclosed as plasticizers for cellulose ethers and esters. The use of alkyl esters of shellac as resin plasticizers for cellulose ester lacquers has been described by Gardner (U. S. 1,910,100). These shellac esters are esters of shellac resin itself, are themselves resinous and polymeric in character, and are not to be confused with the pure crystalline compounds obtained by esterifying aleuritic acid.

An object of the present invention is the preparation of new esters of aleuritic acid derived from shellac. A second object is to use these esters as plasticizers for lacquers containing cellulose ethers and esters. A third object is to prepare compositions, such as those used for molding or extrusion containing derivatives of cellulose, wherein an ester of aleuritic acid is used as a plasticizer. Other objects of my invention will appear from the following description.

The alkyl esters of aleuritic acid may be prepared by any suitable method of esterification as, for example, the Fischer process. These esters are very compatible with cellulose derivatives and furthermore are readily soluble in the usual solvents for cellulose ethers and esters. These new aleuritic acid esters are excellent plasticizers, softening agents, or camphor substitutes and may be used to impart pliability, softness and other desirable properties to plastics, films, filaments, fibers and the like containing derivatives of cellulose.

The esters embraced within this invention may be represented by the structural formula.

$$CH_3-(CH_2)_5-CH-CH-(CH_2)_7-COOR$$
$$\quad\quad\quad\quad\quad\;\; |\quad\;\; |\quad\;\;\;|$$
$$\quad\quad\quad\quad\quad\;\; OH\;\; OH\; OH$$

in which the parent acid is aleuritic acid (9, 10, 16 trihydroxy palmitic acid) and in which R represents any alkyl group such as methyl, ethyl, propyl, butyl, amyl and the like. Melting points and structural formulae of some of the esters described in this application are given in Table I.

Table I

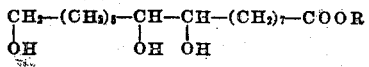

| | Melting point, ° C. |
|---|---|
| Methyl aleuritate, $CH_3-(CH_2)_5-CH-CH-(CH_2)_7-COOCH_3$ | 71–72.5 |
| Ethyl aleuritate, $CH_3-(CH_2)_5-CH-CH-(CH_2)_7-COOC_2H_5$ | 56.5–57.5 |
| Butyl aleuritate, $CH_3-(CH_2)_5-CH-CH-(CH_2)_7-COOC_4H_9$ | 58–59 |
| Amyl aleuritate, $CH_3-(CH_2)_5-CH-CH-(CH_2)_7-COOC_5H_{11}$ | 60–63 |

The term cellulose ether is used in this application to define any derivative in which one or more of the hydroxyl groups of the cellulose have been replaced by alkoxy, aryloxy or aralkoxy groups, as in ethyl cellulose, methyl cellulose and benzyl cellulose. The term cellulose ester defines esters of cellulose with both inorganic and organic acids, such as cellulose nitrate, cellulose acetate, cellulose formate, cellulose propionate, celluose butyrate and the like.

Any suitable method may be employed for preparing and purifying these esters. For example, aleuritic acid may be dissolved in a large excess of the desired alcohol containing 3% anhydrous hydrogen chloride catalyst, and allowed to stand until the acid is substantially esterified. The reaction mixture can then be dissolved in diethyl ether and the catalyst neutralized and any unesterified aleuritic acid extracted by shaking the dilute aqueous sodium carbonate. The desired ester is obtained in substantially pure forms by evaporating the solvent and recrystalyzing the residual ester from aqueous alcohol. Alternatively the process described by Blann, Bassford and Bartovics, in their pending application Shellac ester and method of making same (Serial No. 443,169), Example 6, may be employed.

The esters of aleuritic acids may be incorporated in plastic compositions containing cellulose derivatives and these compositions may be molded, rolled or extended into any desired shape such as sheets, rods, tubes and the like. Molding powders incorporating plastic compositions as described above as well as fillers, pigments and extenders may be molded under heat and pressure to any desired shape. Filaments, yarns and other textile materials may be made from solutions containing organic derivatives of cellulose and an ester of aleuritic acid by extrusion through orifices into an evaporative atmosphere as in dry spinning or into a precipitating bath as in wet spinning.

Solutions containing the cellulose derivative and the ester of aleuritic acid in a volatile solvent and containing, if desired, other plasticizers and resins, may be used as a lacquer for coating metal, wood, paper, leather and other objects, or as an adhesive, as, for example, in the preparation of safety glass, wherein sheets of glass may be bonded together by means of a composition containing a cellulose derivative and an ester of aleuritic acid. The esters of aleuritic acid are particularly serviceable as plasticizing agents for lacquers containing cellulose nitrate dissolved in appropriate solvent mixtures and containing resins compatible with cellulose nitrate and, if desired, other plasticizers, pigments, toners and extenders.

The proportion of the ester of aleuritic acid to the derivative of cellulose may be varied in accordance with the particular requirements, but may be advantageously employed in amounts of 10% or less, to 60% or more, of the weight of cellulose derivative.

The following example, in which the parts are given by weight, are illustrative of this invention:

*Example.*—In Table II are given the amounts of cellulose nitrate, ester gum and various solvents in a typical lacquer, thinned, but without plasticizer.

Table II

| | Parts |
|---|---|
| Cellulose nitrate | 50 |
| Ester gum | 25 |
| Ethyl acetate | 160 |
| Butyl acetate | 20 |
| Ethyl lactate | 10 |
| Ethyl alcohol | 20 |
| Butyl alcohol | 10 |
| Toluene | 80 |
| Xylene | 50 |
| | 425 |

Table III gives the formulae of lacquers A, B, C and D respectively, A being the control, with no plasticizer, B and C lacquers containing commercial plasticizers, and D containing methyl aleuritate, the numerals indicating parts by weight:

Table III

| | A | B | C | D |
|---|---|---|---|---|
| Cellulose nitrate | 50 | 50 | 50 | 50 |
| Ester gum | 25 | 25 | 25 | 25 |
| Solvent | 350 | 350 | 350 | 350 |
| Dibutyl phthalate | | 15 | | |
| Dicyclohexyl phthalate | | | 15 | |
| Methyl aleuritate | | | | 15 |

The above lacquers must be diluted with a thinner until they all have the same viscosity. This result is only a slight change in concentration from that given in Table III. Tin panels are then coated in the lacquer, dried overnight at room temperature and then six days in a 40° C. oven.

Lacquer films were prepared according to the formulation in Table III and were evaluated according to the A. S. T. M. designation B522-39P. Films A, B and C when bent over the conical mandrel specified by this test showed peeling and cracking from the largest diameter to the smallest diameter. In evaluating lacquer D methyl aleuritate was used as the plasticizer, there was no sign of peeling or cracking even to the smallest diameter.

Methyl aleuritate is therefore an excellent plasticizer for cellulose nitrate lacquer, being superior to both of the commercial plasticizers tested. Films containing methyl aleuritate possess greater hardness, flexibility and adhesion than films containing comparable amounts of dibutyl phthalate or dicyclohexyl phthalate.

As many apparently widely different embodiments of this invention may be made without departing from the spirit and scope thereof, it is to be understood that I do not limit myself to the specific embodiments thereof except as defined in the appended claims.

Having described my invention, what I claim and desire to secure by Letters Patent, is as follows:

1. A composition of matter containing: a cellulose derivative selected from the group consisting of cellulose ethers and esters; and a lower alkyl aleuritate.

2. A composition of matter containing: a cellulose derivative selected from the group consisting of cellulose ethers and esters; and an ester of aleuritic acid selected from the group consisting of methyl, ethyl, propyl, butyl, and amyl aleuritates.

3. A flexible filament comprising: a cellulose derivative selected from the group consisting of cellulose ethers and esters; and a lower alkyl aleuritate.

4. A flexible film comprising: a cellulose derivative selected from the group consisting of cellulose ethers and esters; and an ester of eleuritic acid selected from the group consisting of methyl, ethyl, propyl, butyl, and amyl aleuritates.

5. A fiber capable of being formed into useful yarns comprising: a cellulose derivative selected from the group consisting of cellulose ethers and esters; and an ester of aleuritic acid selected from the group consisting of methyl, ethyl, propyl, butyl, and amyl aleuritates.

6. A fiber capable of being formed into useful yarns comprising: a cellulose derivative selected from the group consisting of cellulose ethers and esters; and a lower alkyl aleuritate.

7. A lacquer containing: a cellulose derivative selected from the group consisting of cellulose ethers and esters; a solvent; and a lower alkyl aleuritate.

8. A lacquer containing: a cellulose derivative selected from the group consisting of cellulose ethers and esters; a solvent; and an ester of aleuritic acid selected from the group consisting of methyl, ethyl, propyl, butyl, and amyl aleuritates.

9. A lacquer containing: a cellulose ester; a solvent; and a lower alkyl aleuritate.

10. A lacquer containing: a cellulose ester; a solvent; and an ester of aleuritic acid selected from the group consisting of methyl, ethyl, propyl, butyl, and amyl aleuritates.

11. A lacquer containing: cellulose nitrate; a solvent; and butyl aleuritate.

12. A lacquer containing: cellulose nitrate; a solvent; and propyl aleuritate.

13. A lacquer containing: cellulose nitrate; a solvent; and ethyl aleuritate.

14. A lacquer containing: cellulose nitrate; a solvent; and an ester of aleuritic acid selected from the group consisting of methyl, ethyl, propyl, butyl, and amyl aleuritates.

WILLIAM JOSEPH SARTORI